April 27, 1965  F. J. EICHELMAN ET AL  3,180,396
FLAME TORCH CUTTING MACHINE DEVICE
Filed April 16, 1959  2 Sheets-Sheet 1

INVENTORS
Francis J. Eichelman
Rolland P. Monroe
BY
Atty

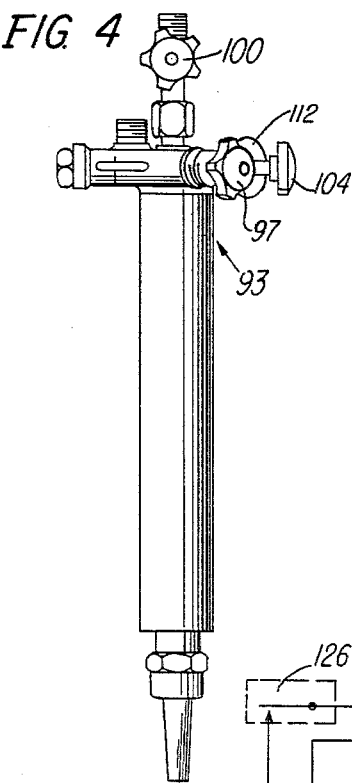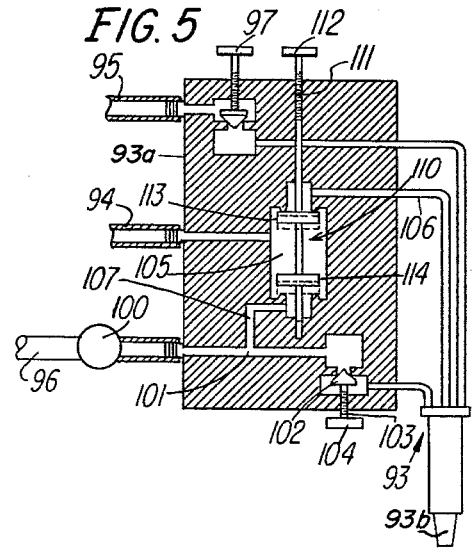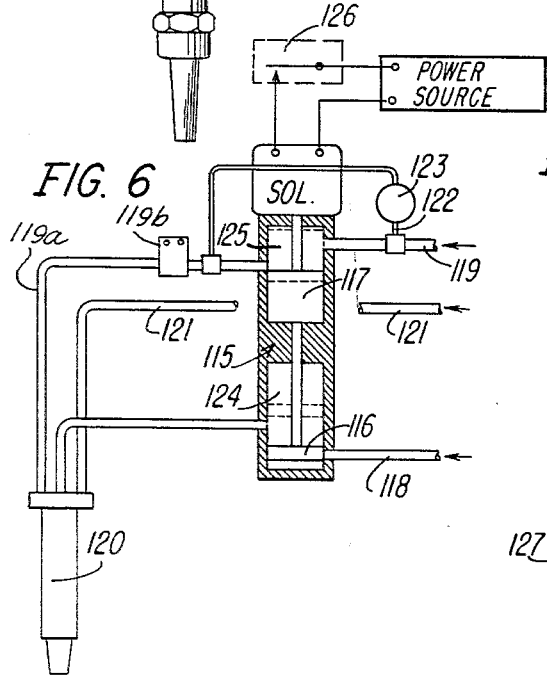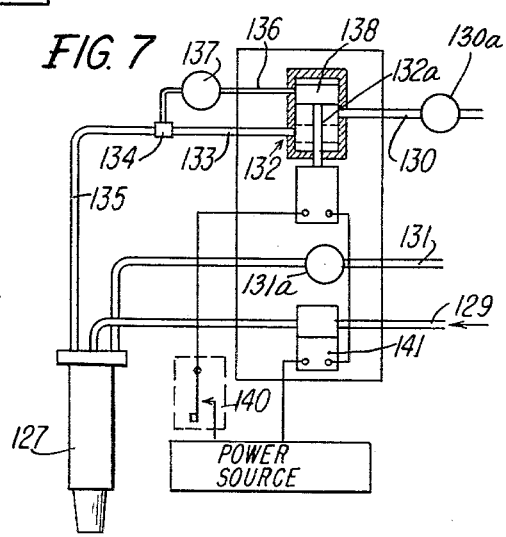
INVENTORS
Francis J. Eichelman
Rolland P. Monroe
BY
Atty

United States Patent Office 3,180,396
Patented Apr. 27, 1965

3,180,396
FLAME TORCH CUTTING MACHINE DEVICE
Francis J. Eichelman, Brookfield, and Rolland P. Monroe, Lombard, Ill., assignors to Chemetron Corporation, Chicago, Ill., a corporation of Delaware
Filed Apr. 16, 1959, Ser. No. 806,954
9 Claims. (Cl. 158—27.4)

This invention relates to a device for use with a flame cutting machine torch adapted to deliver flames of heating gases and a jet of oxidizing or cutting gas to perform a cutting operation on metals. This invention relates more particularly to a cutting machine device which may be selectively operated to control the flow of gases to the torch during the cutting operation.

In utilizing a flame cutting torch of the character referred to, it is desirable for the torch to be precisely and automatically controlled. This is particularly true, for obvious reasons, in a cutting machine employing a plurality of torches controlled simultaneously by a single operator. Before the actual cutting operation begins, it is desirable that the material acted upon, for example, iron or steel, be quickly heated to the temperature necessary for cutting. This preheat phase of the operation requires that a relatively large volume of heating gas be delivered to the torch. However, after the actual cutting operation has been initiated by the release of cutting gas through the torches against material which has been adequately preheated, the metal cutting operation itself generates heat which is transferred to the material undergoing cutting. Accordingly, the amount of auxiliary heat which is required during this phase of the operation is less than the heat required during the preheating phase. If the heating gases are not cut back to correspond to this reduced heat requirement, the heating gases delivered to the work in excess of that required are wasted. In addition, excess heat may impair the quality of the operation. This is true because the application of the proper amount of heat during cutting tends to result in a within-tolerance work product having approximately right-angle edges on the material. However, excess heat tends to produce rounded material edges, wasting the material being cut, and often necessitating an additional operation to bring the edges of the material within tolerance.

Accordingly, it is a principal object of the present invention to provide in a cutting machine employing a plurality of torches, a device whereby an operator at a location relatively remote from the torches may concurrently with the release of cutting gas to the torches automatically adjust the heating gas delivered through the torches from a first volume adapted for fast preheat to a second volume adapted for accurate, efficient cutting.

Another object of the present invention is to provide remotely controlled, electrically operated means for automatically adjusting the amount of heating gas delivered to the torches in a cutting machine during a cutting operation.

A further object of the present invention is to provide a cutting torch with a heating gas line supplied by two branch lines delivering gas at respective predetermined rates, at least one of the branch lines being controlled by a valve member which may be operated toward a closed position concurrently with the operation of a valve member in a cutting oxygen line toward an open position.

Still another object of the present invention is to provide a cutting torch having heating gas and cutting gas supply lines respectively controlled by valve members carried on a common shaft.

While, generally speaking, a lesser amount of auxiliary heat is required during the time the cutting gas is supplied, changes in the material undergoing cutting, such as hard spots caused by slag inclusions, may make it advantageous to temporarily increase the auxiliary heat. Accordingly, a further object of the present invention is to provide means in a cutting machine whereby auxiliary heat may be automatically adjusted to a desired amount concurrently with the initiation of cutting, and in addition, may be increased by a predetermined amount during selected intervals of the actual cutting operation.

Another object of the present invention is to provide for use in a multiple torch cutting machine a novel heating gas control arrangement which is accurate, quick and positive in action, simple, inexpensive and adapted to efficiently carry out high-quality cutting operations on a variety of materials.

Briefly stated, in accord with the illustrated embodiments of the invention, there is provided a torch cutting machine device which may be operated to automatically adjust the amount of auxiliary heat applied to material undergoing cutting to a desired level concurrently with the onset of the actual cutting operation. The device includes a heating gas line supplied by two branch lines delivering gas at respective predetermined rates, one of the branch lines being under the control of a valve member which may be actuated toward a closed position concurrently with the actuation of a valve member in a cutting oxygen line toward an open position. In a preferred electrically operated modification of the invention, the device includes means whereby auxiliary heat may be readily increased at selected intervals during the cutting operation to provide for variations in the material undergoing cutting. This modification includes a heating gas line containing an electrically operated normally-open valve which is by-passed by a line round the normally-open valve. The by-pass line contains adjustable valve means to regulate the flow of gas therethrough to a predetermined level. The cutting gas supply line is controlled by an electrically operated normally-closed valve which is connected to an electrical energy source by a circuit including the electrically operated valve in the heating gas line. The circuit includes switch means arranged to selectively control the flow of gases to the torches during the various phases of the cutting operation.

The invention, both as to its organization, together with further objects and advantages thereof will best be understood by reference to the following specification taken in connection with the accompanying drawings, in which:

FIG. 4 is a perspective view of a cutting torch embodying a modified form of the present invention;

FIG. 5 is a sectional diagrammatic developed view of a portion of the torch of FIG. 4, illustrating the various valve-controlled gas passages of the torch;

FIG. 6 is a somewhat schematic representation of a modified version of the present invention, the valve housing being shown in section; and FIG. 7, similar to FIG. 6, is a somewhat schematic representation of another modification of the present invention.

Figure 1:
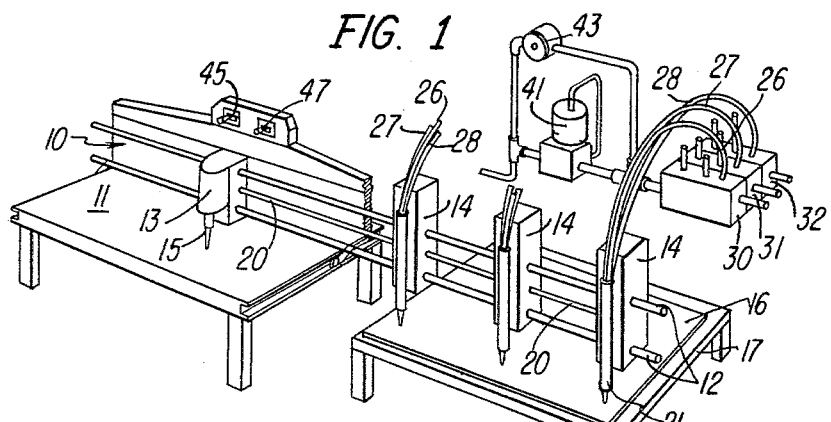
FIG. 1 is a perspective view of a multiple torch cutting machine embodying the present invention, a part of the structure is broken away and a part is shown enlarged for clarity.
Figure 2:
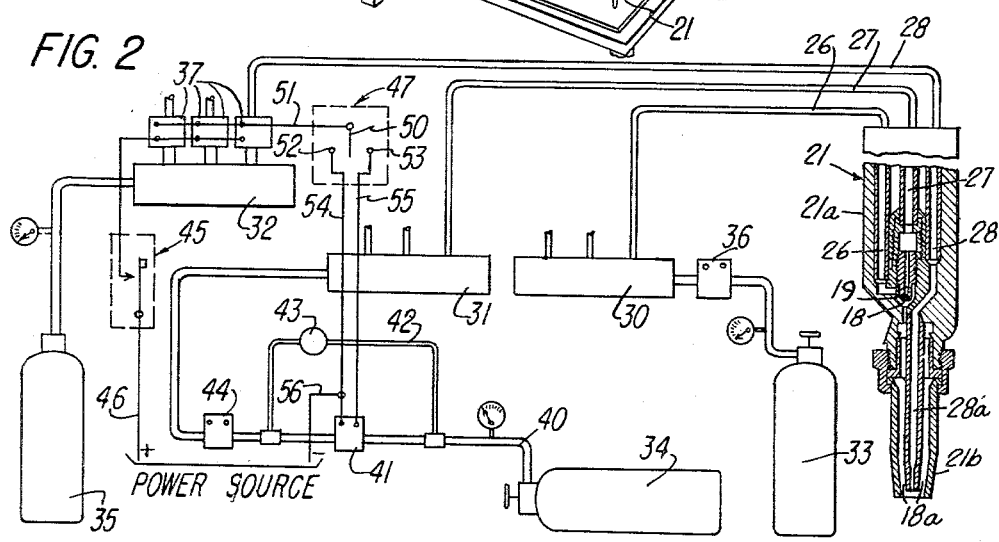
FIG. 2 is a schematic representation of the structure of FIG. 1.

Referring now to the drawings and particularly to FIGS. 1 and 2, there is shown therein a cutting machine embodying the present invention. The cutting machine, which may be of the form shown in U.S. Patent 2,356,215 granted August 22, 1944, to A. F. Chouinard et al., comprises a carriage 10 which travels horizontally on rails over a table 11 on which may be supported a templet, drawing, pattern or other guide and which projects beyond said table. A pair of parallel superposed rails 12 on the carriage 10 supports a drive unit 13 over the table 11, and a plurality of torch crosshead units 14 on the projecting part of said carriage. While only three torch crosshead units are shown for simplicity, it will be understood that any reasonable number, for example, up to eight, may be used in conjunction with the present invention.

The drive unit 13, which may be of any well-known type, includes a tracing element 15 which may be in the form of a tracer wheel, pointer, spot of light, or the like, which can be steered along the outline of the pattern or other guide to be copied or traced.

The torch crosshead units 14 travel over a steel plate 16 or other workpiece on a table 17 to form multiple cuts, and are secured to the drive unit 13 by a bar 20 for movement therewith along the carriage 10. These torch crosshead units 14 may be independently adjustable vertically to adjust the elevation of their respective torches 21 with respect to the work to be cut, and horizontally with respect to the driving unit 13, and to each other. The torches 21 may be of the well-known injector type in which heating gases consisting of a relatively low pressure fuel gas and heating oxygen are directed into an injector chamber 18. The injector arrangement is such that the heating oxygen flows through a reduced diameter nozzle 19 into the chamber, and by aspirator action, controls the flow of fuel gas through the chamber. Thus, when the flow of heating oxygen is increased or decreased, the flow of fuel gas will increase or decrease in response therewith. Each of the torches 21 is provided with the usual conduits 26 and 27 for delivering fuel gas and heating oxygen respectively to the torchhead 21a and the tip 21b attached thereto, and a conduit 28 for delivering cutting oxygen to said torchhead. Each of the torches 21 also includes a central cutting oxygen passage 28a in communication with conduit 28, and heating gas passages 18a in communication with injector chamber 18. The conduits 26, 27 and 28 are respectively connected to conventional manifolds 30, 31 and 32, which in turn, are respectively connected by supply lines to sources of the respective gases illustrated in FIG. 2 as gas supply cylinders 33, 34 and 35. However, it will be understood that the fuel gas source may advantageously be a utility gas supply line.

The fuel gas in supply cylinder 33 may be natural gas. However, other fuel gases such as L.P.G. may advantageously be used with the apparatus shown in FIGS. 1 and 2. A valve 36, which may be of the solenoid operated type, may be disposed in the fuel gas line leading from cylinder 33 to manifold 30.

The flow of cutting oxygen from the cylinder 35 to the torches 21 is controlled by solenoid-operated, normally-closed valves 37 respectively disposed in the conduits 28 extending from the manifold 32 to the respective torches.

A heating oxygen line 40 extends from the heating oxygen supply cylinder 34 to the manifold 31. The line 40 includes means to control the flow of gas through the line consisting of a solenoid-operated, normally-open valve 41. The valve 41 is of a type which may be adjusted to permit a predetermined amount of gas to flow through it when it is in its normally-open position and which is operated to a fully closed condition on the energization of its associated solenoid. A line 42 connected around the valve 41, using conventional T fittings, serves as means to by-pass the valve 41. The by-pass line 42 has disposed therein means to precisely limit the flow of gas therethrough which in a preferred form to cover the wide range of cutting conditions that may be encountered may consist of a needle valve 43 which may be manually precisely adjusted to control the amount of gas which may flow through the line 42. However, it will be understood that other means to limit the gas flow through the line may be used, for example, the line 42 may be provided with an orifice.

The line 40 may also include a valve 44 which may be of the solenoid-operated type and be disposed between by-pass line 42 and the manifold 31.

The solenoid valve 41, disposed in the heating oxygen line, and the solenoid valves 37 controlling the cutting oxygen line are electrically connected into a circuit which includes an electrical power source as shown in FIG. 2. As illustrated in FIG. 2, the solenoid valves 37 controlling the cutting oxygen are electrically connected in parallel. The valves 37 may be operated from their normally-closed condition to open condition by closing a conventional, manually operated, single pole, single-throw switch 45 which is disposed in an electrical conductor line 46 extending between the power source and the parallel-connected solenoid valves 37.

The heating gas control means includes a manually-operated, single-pole double-throw switch 47 disposed in the circuit containing the solenoid-operated valves 37 and 41. The switch 47 includes a movable pole 50 which is connected to the solenoid valves 37 by a line 51. The switch also includes fixed contacts 52 and 53 which are respectively connected to the solenoid valve 41 by conductors 54 and 55. The circuit is completed by a conductor 56 which extends from conductor 54 to the power source.

The operation of the novel structure shown in FIGS. 1 and 2 may best be understood by describing its use in connection with a typical cutting operation. Assuming that the operator wishes to reduce the amount of fuel gas flowing through the torches simultaneously with the release of cutting oxygen to the work, he initially moves the movable pole 50 into engagement with fixed contact 53. The circuit shown in FIG. 2 is then preset for cutback of the preheat fuel gas simultaneously with the release of cutting gas to the work. The operator then operates the valves 36 and 44 into open condition by any appropriate means (not shown), and as solenoid valve 41 is in its normally-open condition, the work may be preheated by burning the mixture of fuel gas and oxygen delivered through the torches 21. It will be noted that at this phase of the operation the heating oxygen flowing through the torchheads is the sum of the heating oxygen flowing through the valve 41 and that flowing through the valve 43. When the operator determines that the work has reached the temperature suitable for cutting, he then closes the switch 45, completing a circuit to the normally-closed cutting oxygen solenoid valves 37, and to the normally-open heating oxygen solenoid valve 41. This circuit may be traced from the positive side of the power source, through conductor 46, switch 45, the solenoids 37, line 51, pole 50, conductor 55, the solenoid 41, conductor 56 and back to the negative side of the power source, completing the circuit. This energizes the coils of solenoid valves 37 and 41, operating the valves to release a stream of cutting oxygen from cylinder 35, through the lines 28 and through the torchheads to the work, and at the same time reducing the flow of heating gas to the work. The reduction in heating gas flow occurs because with the operation of valve 41 to closed position, the heating oxygen delivered to the torchheads is limited to that which valve 43 permits to flow through the by-pass line 42. The resulting decrease in amount of heating oxygen flowing through the torchheads causes a corresponding decrease in fuel gas aspirated through the torchhead. Accordingly, the amount of auxiliary heat directed to the work is correspondingly decreased to an amount which is appropriate for the cutting operation.

The inventive structure illustrated in FIGS. 1 and 2 may also be operated to delay the reduction in the amount of fuel gas flowing through the torches until the lapse of a suitable time interval after the release of cutting oxygen to the work. In this event, the operator manually places the movable pole 50 of switch 47 in engagement with contact 52. The circuit of FIG. 2 is then preset for cutback of the preheat fuel gas at any desired interval after the release of cutting gas to the work. After initiating preheating as described above, when the operator determines that preheat has reached a desired level, he closes the switch 45 releasing the cutting oxygen through the torches. As contact 53 is not engaged, no current passes through line 55 to solenoid valve 41 and it remains in open position, maintaining the flow of the heating oxygen and fuel gas at the preheat level. This continues until the operator determines that it is desirable to reduce the auxiliary heat. He then operates switch 47 to move pole 50 to engage contact 53, including solenoid valve 41 in the circuit, operating it into closed condition, resulting in a corresponding decrease in the flow of heating gas to the torches. The cutting oxygen will continue to flow to the work because switch 45 remains in closed condition and the circuit for the solenoids 37 is complete through line 55, the coil of valve 41, and line 56 to the source. If desired, a conventional holding circuit (not shown) may be added to the circuit of FIG. 2 to maintain the energization of the coils of valves 37 during the interval in which pole 50 moves out of engagement with contact 52 and into engagement with contact 53.

The novel structure of FIGS. 1 and 2 also provides means to provide additional auxiliary heat during cutting when desirable, as for example, when hard spots due to slag inclusions are encountered.

If the operator should note that the material requires additional auxiliary heat for improved cutting results, it is only necessary for the operator to operate the switch 47 to move the movable pole 50 from contact 53 to contact 52 to provide the additional auxiliary heat. This action opens the circuit to the solenoid valve 41 actuating the valve 41 to open position. Accordingly, the amount of the heating oxygen flowing to the torchhead will include not only the component flowing through the valve 43 but also that flowing through the now open valve 41. Cutting oxygen will, of course, continue to flow to the work inasmuch as the valves 37 are in a closed circuit with switch 45 closed and pole 50 engaging contact 52 completing a circuit through lines 54 and 56. The increased amount of the heating oxygen flowing to the torchhead will cause the aspiration of a correspondingly greater amount of fuel gas through the torchhead and, therefore, provide an increased amount of heat. The operator, of course, may terminate this additional auxiliary heat at any time by moving the switch pole 50 from contact 52 to engage contact 53.

The advantages of the present invention are not limited to cutting machines using injector type torches but are readily adapted to machines using torches suitable for use with gases such as acetylene.

Figure 3:
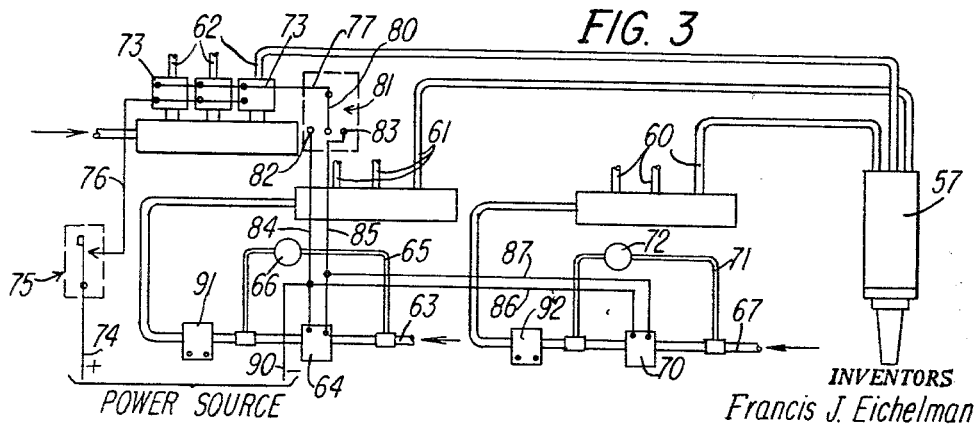
FIG. 3 is a schematic representation of a modified form of the cutting machine of FIG. 1.

Referring now to FIG. 3, there is shown somewhat schematically therein a cutting machine arrangement similar to that shown in FIG. 2 except that the arrangement is adapted to the use of a fuel gas such as acetylene which is normally handled under relatively high pressure as compared to fuel gases such as natural gas. The higher pressures associated with acetylene make the injector type torch unsuitable for use with it. Accordingly, conventional torches of the type which may be used with acetylene fuel gas are used with the cutting machine arrangement of FIG. 3 rather than the injector type torches illustrated in FIG. 2. As shown in FIG. 3, the torches 57, only one of which is illustrated for simplicity, are provided with fuel gas lines 60 and heating oxygen lines 61 delivering the respective heating gases, while cutting oxygen is delivered through lines 62. As the arrangement shown in FIG. 3 does not include means to control the volume of fuel gas flowing through the torch by controlling the heating oxygen flow therethrough such as the injector type torch arrangement shown in FIGS. 1 and 2, it can be seen that the fuel gas and the heating oxygen must be separately controlled to adjust the amount of heat delivered to the work during the cutting operation.

Accordingly, the modified form of the invention shown in FIG. 3 includes a bypass valve arrangement not only in the heating oxygen line but in the fuel gas line also. The heating oxygen from a source (not shown), is supplied through a line 63 which includes a solenoid operated valve 64 of the normally-open type, and a line 65 which by-passes the solenoid valve 64. The by-pass line 65 includes means for precisely limiting the amount of gas flowing through it, in a preferred form consisting of a manually adjustable needle valve 66. The acetylene fuel gas is delivered through a line 67 which also includes a solenoid-operated valve 70 of the normally-open type. This solenoid valve 70 is by-passed by a line 71. The by-pass line 71 includes means providing a precise control of the gas flowing through it, in a preferred form consisting of a manually adjustable needle valve 72. The solenoid valves 64 and 70 are electrically connected in parallel to effect their simultaneous operation. The structure of FIG. 3 also includes means for controlling the flow of cutting oxygen to the torches consisting of solenoid-operated valves 73 of the normally-closed type electrically connected in parallel, and respectively disposed in the cutting oxygen lines 62. The valves 73 may be substantially the same as the valves 37 of FIG. 2 described above. The circuit and controls for the solenoid-operated valves 64, 70 and 73 of FIG. 3 is generally similar to that described in connection with the structure of FIG. 2. A line 74 connects the positive side of an electric current power source to the movable-pole of a manually operable single pole, single throw switch 75. A line 76 connects the fixed contact of the switch 75 to one side of the parallel-connected solenoids 73. A line 77 connects the other side of the parallel-connected solenoids 73 to a movable pole 80 of a manually operable single pole double throw switch 81. The switch 81 includes fixed contacts 82 and 83, respectively connected to lines 84 and 85 for energizing the solenoid 64. Branch lines 86 and 87 for energizing the solenoid 70 are joined to the lines 84 and 85. A line 90 is joined to the line 84 and connected to the negative side of the power source completing the circuit. The switches 75 and 81 described above, like the switches 45 and 47 of FIG. 2, provide means for adjusting heating gas from a location relatively remote from the torches. This is particularly advantageous in large torch cutting machines of the multiple torch type where the operator, of necessity, is stationed relatively remote from the torches.

The operation of the circuit of FIG. 3 to provide remotely controlled, electrically operated automatic heating gas adjustment is substantially the same as that of FIG. 2. As shown, the circuit is such that it may be selectively preset by the operator to automatically reduce the amount of heating gases flowing to the torches simultaneously with the release of cutting oxygen by operating pole 80 to engage contact 83, or the circuit may be preset so that the flow of heating gases can be cut back at a desired interval after the release of cutting oxygen by operating pole 80 to engage contact 82. The circuit also permits the operator to increase auxiliary heat at selected intervals during cutting by moving pole 80 from engagement with contact 83 into engagement with contact 82, interrupting the energization of the heating gas solenoids 64 and 70. The circuit of FIG. 3 will be briefly described as it is operated to reduce heating gas flow concurrently with the release of cutting oxygen. The operator presets the circuit by manually operating switch 81 to place pole 80 in engagement with contact 83. The operator then initiates preheating by opening valves 91 and 92, respectively disposed in the heating oxygen line 63 and the fuel gas line 67, and ignites the heating gases emerging from the torches. Any suitable means (not shown) may be used to open the valves 91 and 92. Assuming that switch 75 is in open position, preheat will be at a predetermined relatively high level corresponding to the flow of gases through the normally-open solenoid valves 64 and 70 and the respective bypass lines 65 and 71. When the operator decides that the work has been preheated to the cutting temperature he closes switch 75, releasing cutting oxygen to the work and cutting back auxiliary heat through the energization of the solenoids 73, 64 and 70. The circuit accomplishing this may be traced as follows: from the power source through line 74, switch 75, line 76, the parallel-connected solenoids 73, line 79, line 80, contact 83, line 85, from line 85 through solenoid 64 and line 90 back to the source, and from line 85 through line 87, solenoid 70, line 86, and line 90 back to the source, completing the circuit. The operation of the circuit of FIG. 3 to reduce auxiliary heat after cutting oxygen has been released to the torch, and to increase auxiliary heat during cutting is substantially the same as that of the circuit of FIG. 2 and, therefore, will not be described in detail.

Referring now to FIGS. 4 and 5, there is shown therein another version of the present invention. FIGS. 4 and 5 illustrate an injector type cutting torch 93, including a novel valve arrangement described below, which is supplied by an oxygen line 94, a fuel gas line 95, delivering a gas such as LPG or natural gas to the torch, and a heating oxygen line 96. The arrangement of the valves used to control the flow of gases to the cutting torch 93 is best shown in FIG. 5. The fuel gas line 95 is controlled by a conventional manually operable valve 97 which is mounted in the torch body 93a substantially as shown in FIG. 5. Heating oxygen delivered through the line 96 from a source, not shown, is precisely controlled by means disposed in the line 96 which in a preferred form may consist of a needle valve 100. The line 96 is connected to the torch tip by an internal passageway 101, which is controlled by a valve 102 actuated by a threaded stem 103, having a knob 104. The oxygen line 94 is connected from a source, not shown, to a chamber 105 in the torch body. A passage 106 leads from chamber 105 to the cutting oxygen passage (not shown) in the torch tip 93b. A passage 107 in the torch body connects the chamber 105 with passageway 101 at a location downstream from the valve 100. The flow of gas from the chamber 105 is controlled by a valve 110 operated in the valve chamber by a threaded valve shaft 111, by means of a knob 112. The shaft 111 carries two spaced-apart valve members, 113 and 114, which are manually movable in the chamber 105 by operating knob 112. When the knob 112 is manipulated to place the valve 110 in its uppermost position, valve member 113 is positioned against the upper wall of chamber 105 so that gas flowing into chamber 105 from line 94 is prevented from entering passage 106. However, as valve member 114 is moved away from the opening in the lower wall of the chamber in this disposition of the valve 110, gas from chamber 105 can enter passage 101 through passage 107. Accordingly, the oxygen portion of the heating gases will consist of a component flowing through the passage 107 in addition to that which flows through valve 100. When knob 112 is manipulated to place valve 110 in its lowermost position, valve member 114 covers the opening to passage 107 but valve member 113 is positioned to permit oxygen from chamber 105 to enter passage 106 on its way to the cutting oxygen passage (not shown) in the torch tip 93b.

Describing now the operation of the torch shown in FIGS. 4 and 5; during the preheat portion of the cutting operation, the valve 110 is in its uppermost or first position (shown in solid line) in which the oxygen portion of the heating gas flowing to the torch is comprised of two components, one component of which flows through valve 102 from line 96 controlled by the valve 100, and a second component which flows from the chamber 105 through the passage 107 into the passage 101. The two components together flowing into the injector chamber in the torch (not shown) aspirate a desired predetermined amount of fuel gas through the torch. As valve member 113 blocks the passage 106, no cutting oxygen can flow to the torch tip at this time. When the operator determines that the material, for example, metal, undergoing the cutting operation has reached a desired temperature, he then operates the valve 110 to its lowermost or second position (shown in broken line) in which valve member 114 closes the passage 107 and valve member 113 has been moved downward so as to permit cutting oxygen to flow from the chamber 105 through passage 106 to the cutting oxygen passage (not shown) in the torch tip 93b. Accordingly, as cutting oxygen is released to the torch tip 93b, the amount of oxygen flowing through the line 101 is reduced by the amount that flowed through the passage 107 before the valve 110 was operated to its second position. This decrease in the amount of oxygen flowing through line 101 to the injector chamber in the torch (not shown) will cause a corresponding decrease in the amount of fuel gas which is aspirated through the torch. While the preferred arrangement illustrated in FIGS. 4 and 5 utilizes two spaced-apart valve members, it will be apparent to those skilled in the art that with appropriate changes in the structure in chamber 105, a single valve member could be operated to control the passages 106 and 107.

Referring now to FIG. 6, there is shown therein still another modification of the present invention. A solenoid-operated valve 115 is illustrated containing two spaced-apart valve members, 116 and 117 carried on a common shaft and respectively controlling the flow of cutting oxygen from a line 118, and the flow of heating oxygen from a line 119 to an injector type torch 120. Fuel gas is supplied to the torch injector chamber (not shown) through a line 121. A line 122, containing a needle valve 123, by-passes the valve 115 and is connected to a heating oxygen line 119a downstream of the valve 115. The line 119a is connected to the torch 120 and may also include a valve 119b of the solenoid-operated type disposed between the junction of lines 119a and 122 and the torch 120. During the preheat portion of the cutting operation, the valve members 116 and 117 are respectively disposed in valve chambers 124 and 125 in the positions indicated by solid lines. Heating oxygen directed to the torch thus includes two components, one flowing through the valve chamber 125 and the other flowing through the by-pass line 122 under the control of valve 123. As the torch 120 is of the injector type, this volume of heating oxygen will aspirate a proportional amount of fuel gas through the torch delivering a predetermined amount of heat to the work. The valve member 116 being in its solid line position will prevent cutting oxygen from line 118 from flowing to the torch. When the operator determines that the work has been sufficiently preheated, he then operates a switch 126 controlling the valve 115 and the valve members 116 and 117 will move to their broken line positions. Accordingly, cutting oxygen will be released to flow from the line 118 through the chamber 124 to the cutting oxygen passage in the torch tip (not shown) to initiate the actual cutting operation. At the same time, the valve member 117 now blocking the line entering the chamber 125, will reduce the amount of heating oxygen delivered to the work to that amount which flows through the by-pass line 122. Accordingly, the reduced flow of heating oxygen will cause a corresponding decrease in the amount of fuel gas aspirated through the injection chamber, resulting in the desired decrease in the amount of auxiliary heat.

Referring now to FIG. 7, there is shown therein a modification of the present invention which may be advantageously used where limited space is a problem. The arrangement shown in FIG. 7 is utilized in conjunction with torches 127 of the injector type, only one of which is shown. The torch 127 is supplied by the usual heating gas lines comprising a heating oxygen line 130 and a fuel gas line 131, both including conventional means to control gas flow therethrough such as the valves 130a and 131a, respectively, and connected to sources (not shown). The torch 127 is also provided with a cutting oxygen line 129. The heating oxygen line is controlled by a solenoid-operated valve 132 of a conventional dual-position type which is relatively compact so as to be adapted for use where space is limited. The valve 132 includes a chamber 132a with an inlet opening connected to line 130, and two outlet openings, one leading to a line 133 connecting through a T fitting 134 to a line 135 leading directly to the torch injector chamber (not shown), and one leading to a line 136 connected to line 135 through T fitting 134. The line 136 includes means to accurately control the flow of gas therethrough preferably consisting of a manually operable fine adjustment valve 137 as illustrated in FIG. 7. During preheating the valve 132 is disposed so that the movable valve member 138 is in the position shown in solid line in FIG. 7, blocking gas flow through line 136. The heating oxygen flowing to the torch through line 133 aspirates a predetermined volume of fuel gas through the torch injector chamber (not shown) to preheat the material undergoing cutting. When the operator determines that the material has reached a desired temperature he then operates a switch 140 to close an energized circuit including the solenoid associated with valve 132 and a normally-closed cutting oxygen solenoid valve 141, releasing the stream of cutting oxygen to the work, and concurrently, energizing the coil associated with valve 132, moving valve member 138 to cover the valve chamber outlet to line 133 as shown in broken line in FIGURE 7, reducing the amount of heating oxygen flowing to the torch injector chamber (not shown) to the predetermined limited amount which flows through the by-pass line 136. Accordingly, there will be a corresponding decrease in the fuel gas aspirated through the torch and the auxiliary heat applied to the work.

While only one torch is illustrated in connection with the modifications of the present invention respectively shown in FIGS. 6 and 7, it will be obvious that additional torches could be handled by each of the modifications by adding conventional manifolds and appropriate gas connecting arrangements well known in the art.

While there has been described what is at present considered to be the preferred embodiments of invention, it will be understood that various modifications may be made therein, and it is intended to cover in the appended claims all such modifications as fall within the scope of the invention.

We claim:

1. In a torch metal cutting machine the combination comprising: at least one torch adapted to deliver a cutting jet and a heating flame; a first supply line connected to said torch for delivering a fuel gas to said torch to form the heating flame; a second supply line connected to said torch for delivering oxygen to said torch to form the heating flame; a normally-open electrically operated valve in said second supply line; a by-pass line connected to said second supply line around said normally-open valve; means in said by-pass line to regulate the flow of oxygen therethrough to a predetermined rate; a third supply line connected to said torch for delivering oxygen to said torch to form the cutting jet; a normally-closed electrically operated valve in said third supply line; an electrical current power source; a common electrical circuit connecting said electrically operated valves to said power source; and means to reduce the flow of fuel gas through the torch concurrently with the release of cutting oxygen to the torch including a control switch for said valves in said circuit manually operable between open circuit and closed circuit positions, the open circuit position of said switch corresponding to a first valve condition in which the oxygen delivered to the torch to form the heating flame is of a predetermined volume consisting of two components, one of which flows through the valve in said second supply line and the other of which flows through the by-pass line, while no oxygen is being delivered to the torch to form the cutting jet because of the closed position of said third supply line valve, and the operation of said switch into closed circuit position actuating the operation of said valves to establish a second valve condition in which the oxygen delivered to the torch to form the heating flame is adjusted to a predetermined volume consisting of only the single component which flows through the by-pass line, while oxygen is being delivered through said third supply line to the torch to form the cutting jet.

2. In a torch cutting machine the combination comprising: at least one torch adapted to deliver a cutting jet and a heating flame; a first supply line connected to said torch for delivering a fuel gas to said torch to form the heating flame; a second supply line connected to said torch for delivering oxygen to said torch to form the heating flame; a valve member disposed in said second supply line; a by-pass line connected to said second supply line around said valve member; means in said by-pass line to regulate the flow of oxygen therethrough to a predetermined level; a third supply line connected to said torch for delivering oxygen to said torch to form the cutting jet; a valve member in said third supply line; a common shaft carrying said valve members; an electrical power source; electrically energizable means to move said shaft so as to operate said valve members to regulate the flow of gases through said second supply line and said third supply line; an electrical circuit connecting said electrically energizable means to said power source; and means to reduce the flow of fuel gas through the torch concurrently with the release of cutting oxygen to the torch including a switch in said circuit manually operable between open circuit and closed circuit positions to control said valve members, the open circuit position of said switch corresponding to a first valve condition in which the respective valve members are disposed so that oxygen delivered to the torch to form the heating flame is of a predetermined volume consisting of two components, one of which flows through the valve in said second supply line and the other of which flows through the by-pass line, with no oxygen being delivered to the torch to form the cutting jet, and the closed circuit position of said switch actuating the operation of said valve members to establish a second valve condition in which the oxygen delivered to the torch to form the heating flame is of a predetermined lesser volume consisting of only the single component which flows through the by-pass line, while oxygen is being delivered through said third supply line to the torch to form the cutting jet.

3. In a torch metal cutting machine the combination comprising: a torch adapted to deliver a cutting jet and a heating flame; a supply line connected to said torch for delivering a fuel gas to said torch to form the heating flame; a supply line connected to said torch for delivering heating oxygen to said torch to form the heating flame; an electrically operated valve disposed in said heating oxygen supply line, said valve having a chamber and a movable valve member disposed therein, said chamber having an inlet opening connected to said heating oxygen supply line, and two outlet openings; electrically energizable means to operate said movable valve member to close a selected one of said outlet openings; a first line connecting a first one of said outlet openings to the torch; a second line connecting a second one of said outlet openings to said first line; means in said second line to precisely limit the flow of gas therethrough; a third supply line connected to said torch for delivering oxygen to said torch to form the cutting jet; an electrically-operated normally-closed solenoid valve member in said third supply line; an electrical circuit connecting said energizable means and said third supply line valve member solenoid to a power source; and means to reduce the flow of fuel gas through the torch concurrently with the release of cutting oxygen to the torch including a manually operable switch in said circuit to control said valve members, the open circuit position of said switch corresponding to a first valve condition in which the respective valve members are disposed so that oxygen delivered to the torch to form the heating flame consists of oxygen which flows through said first outlet opening into said first line, and no oxygen may flow to the torch to form the cutting jet, and the closed circuit position of said switch actuating the operation of said valve members to establish a second valve condition in which the oxygen delivered to the torch to form the heating flame consists of the predetermined volume which may flow through said second line, and oxygen may be delivered through said third supply line to the torch to form the cutting jet.

4. In a torch cutting machine the combination comprising: a torch adapted to deliver cutting and heating jets; a first supply line connected to said torch for delivering a fuel gas to said torch to form the heating jet; a second supply line connected to said torch for delivering heating oxygen to said torch to form the heating jet; a normally-open electrically operated valve in said second supply line; a by-pass line connected to said second supply line around said normally-open valve; means in said by-pass line to regulate the flow of oxygen therethrough to a predetermined rate; a third supply line connected to said torch for delivering cutting oxygen to said torch to form the cutting jet; a normally-closed electrically operated valve in said third supply line; an electrical current power source; a common electrical circuit adapted to connect said electrically operated valves to said power source; and control means selectively settable to automatically reduce the flow of heating oxygen through the torch simultaneously with the release of cutting oxygen to the torch, or to maintain the flow of heating oxygen after the release of cutting oxygen to the torch, including a switch for said valves in said circuit manually operable between a first position and a second position; the first position of said switch establishing a circuit including both of said electrically operated valves whereby they may be simultaneously operated to control their respective circuits, and the second position of said switch establishing a circuit including only the valve in said third supply line whereby it may be operated to control its circuit independently of the valve in said second supply line.

5. In a torch cutting machine the combination comprising: a torch adapted to deliver a cutting jet and a heating flame; a first supply line connected to said torch for delivering a fuel gas to said torch to form the heating flame; a second supply line connected to said torch for delivering heating oxygen to said torch to form the heating flame; a normally-open electrically-operated solenoid valve in said second supply line; a by-pass line connected to said second supply line around said normally-open valve; means in said by-pass line to accurately limit the flow of oxygen therethrough; a third supply line connected to said torch for delivering cutting oxygen to said torch to form the cutting jet; a normally-closed electrically operated solenoid valve in said third supply line; an electrical current power source; a common electrical circuit connecting the solenoids of said electrically operated valves to said power source; means to reduce the flow of fuel gas through the torch concurrently with the release of cutting oxygen to the torch including a control switch for operating said valves disposed in said circuit and manually operable between open circuit and closed circuit positions; and means to increase the flow of fuel gas through the torch while cutting oxygen is flowing therethrough including control means which may be operated to open the circuit for the energization of the solenoid of the electrically operated valve in said second supply line to actuate it to open condition while said control switch remains in closed circuit position.

6. In a flame cutting machine having at least one torch adapted to deliver a cutting jet and a heating flame, an injector chamber formed within said torch, said injector chamber having an injector nozzle disposed therein, a first supply line in communication with said injector chamber for delivering a fuel gas to said torch injector chamber, a second supply line in communication with said injector chamber for delivering oxygen to said torch injector chamber through its nozzle, said fuel gas and oxygen together forming a mixture for supplying the heating flame, the nozzle and injector chamber being so arranged that oxygen passing through them will aspirate fuel gas through the injector chamber, and a third supply line connected to said torch for delivering oxygen for supplying the cutting jet, the combination with said flame torch cutting machine of an improved control system comprising: an electrical current power source, an electrically operated normally-open valve in said second supply line, a by-pass line around said normally-open valve, means to regulate the flow of gas in said by-pass line to a predetermined rate of flow, an electrically operated normally-closed valve in said third supply line, a common electrical circuit connecting said electrically operated valves to said power source, means connected to said circuit to reduce the flow of fuel gas through the torch concurrently with the formation of the cutting jet including, a control switch for said electrically operated valves manually operable between open circuit and closed circuit positions, the open circuit position of said switch establishing a first valve condition in which the oxygen delivered to the torch injector chamber to aspirate fuel gas therethrough to supply the heating flame is of a predetermined volume consisting of two components, one of which flows through the valve in said second supply line and the other of which flows through the by-pass line, while no oxygen is being delivered to the torch to supply the cutting jet because of the closed condition of said third supply line valve, and the operation of said switch into closed circuit position actuating the operation of said valves to establish a second valve condition in which the oxygen delivered to the torch to supply the heating flame is reduced to a predetermined volume consisting of only the single component which flows through the by-pass line, thus aspirating a proportionately lesser volume of fuel gas through the injector chamber, while oxygen is being delivered through said third supply line to supply the cutting jet.

7. In a cutting torch adapted to deliver a cutting jet and a heating flame from a tip, the combination comprising: a torch body, said torch body including wall structure forming an oxygen chamber, means forming a tip for said torch, a first supply line means for delivering fuel gas to said torch to supply the heating flame, a second supply line means for delivering oxygen to said chamber, a first passage means for delivering oxygen from said chamber to said tip connected to said tip to supply the cutting jet, a first valve member in said chamber controlling oxygen flow through said first passage means operable into either open or closed condition, a passage formed within said torch body for delivering oxygen to supply the heating flame, aspirating means disposed within said heating oxygen passage to aspirate fuel gas through said first supply line to supply the heating flame, a third supply line connected to said heating oxygen passage for delivering oxygen to said torch to supply the heating flame, a second passage formed within said torch body and extending between said chamber and said heating oxygen passage to deliver oxygen from said chamber to said heating oxygen passage, a second valve member in said chamber controlling oxygen flow through said second passage operable into either open or closed condition, said first valve member and said second valve member being mounted on a common shaft, and control means for said valve members adapted to operate said second valve member into its closed condition on the operation of said first valve member into its open condition, whereby the oxygen delivered through said heating oxygen passage may be reduced by the amount delivered through the passage controlled by said second valve member.

8. In a cutting machine the combination comprising: a torch adapted to deliver a cutting jet and a heating flame; a first supply line in communication with and delivering a fuel gas to said torch; a second supply line in communication with and delivering oxygen to said torch to supply the heating flame; means in said torch to vary the flow of fuel gas to said torch in direct response to the flow of oxygen to supply the heating flame to said torch; a normally-open electrically-operated valve in said second supply line; a by-pass line connected to said second supply line around said normally-open valve; means in said by-pass line to regulate the flow of gas therethrough to a predetermined level; a third supply line for delivering oxygen to said torch to supply the cutting jet; a normally-closed electrically-operated valve in said third supply line; an electrical current power source; a common electrical circuit connecting said electrically operated valves to said power source; and means to reduce the flow of fuel gas to the torch concurrently with the formation of the cutting jet including a control switch for said valves in said circuit manually operable between open circuit and closed circuit positions, the open circuit position of said switch establishing a first valve condition in which the oxygen delivered to the torch to supply the heating flame is of a predetermined volume consisting of two components, one of which flows through the valve in said second supply line and the other of which flows through the by-pass line while no oxygen is being delivered to the torch to form the cutting jet because of the closed position of said third supply line valve, and the closed circuit position of said switch actuating the operation of said valves to establish a second valve condition in which the oxygen delivered to the torch to supply the heating flame is of a predetermined lesser volume consisting of only the single component which flows through the by-pass line, while oxygen is being delivered through said third supply line to the torch to supply the cutting jet.

9. A torch metal cutting machine as claimed in claim 1, including a normally-open electrically operated valve in said first supply line, a by-pass line connected to said first supply line around said normally-open valve, and means in said by-pass line to regulate the flow of fuel gas at a predetermined rate, said electrical circuit being arranged to operate said normally-open valves concurrently upon operation of said control switch.

References Cited in the file of this patent

UNITED STATES PATENTS

| | | |
|---|---|---|
| 2,100,673 | Schwander | Nov. 30, 1937 |
| 2,378,346 | Wigton | June 12, 1945 |
| 2,480,281 | Begerow | Aug. 30, 1949 |
| 2,482,843 | Crouch | Sept. 27, 1949 |
| 2,622,668 | Buckle | Dec. 23, 1952 |

PERCY L. PATRICK, *Primary Examiner.*

FREDERICK KETTERER, FREDERICK L. MATTESON, JR., *Examiners.*